United States Patent
Hui et al.

(10) Patent No.: US 10,499,332 B2
(45) Date of Patent: *Dec. 3, 2019

(54) MOBILE NETWORK TRAFFIC OPTIMIZATION

(71) Applicant: T-Mobile USA, Inc., Bellevue, WA (US)

(72) Inventors: Jie Hui, Mercer Island, WA (US); Himesh Bagley, Seattle, WA (US); Jeffery A. Smith, Bothell, WA (US); Antoine T. Tran, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,197

(22) Filed: Oct. 9, 2017

(65) Prior Publication Data

US 2018/0035371 A1    Feb. 1, 2018

Related U.S. Application Data

(63) Continuation of application No. 13/800,210, filed on Mar. 13, 2013, now Pat. No. 9,820,224.

(60) Provisional application No. 61/610,979, filed on Mar. 14, 2012.

(51) Int. Cl.
*H04W 52/02* (2009.01)
*H04L 12/24* (2006.01)
*H04W 28/16* (2009.01)

(52) U.S. Cl.
CPC ..... *H04W 52/0212* (2013.01); *H04L 41/0896* (2013.01); *H04W 28/16* (2013.01); *Y02D 70/00* (2018.01)

(58) Field of Classification Search
CPC .. H04L 41/0896; H04L 47/283; H04W 28/16; H04W 28/20; H04W 28/22; H04W 48/18; H04W 52/0232; H04W 52/0212; Y02D 70/00
USPC ................................ 370/230, 252, 322, 335
See application file for complete search history.

(56) References Cited

U.S. PATENT DOCUMENTS

| 5,396,490 A | 3/1995 | White et al. |
| 7,027,415 B1 * | 4/2006 | Dahlby ............... H04L 41/0896 370/322 |
| 7,505,795 B1 * | 3/2009 | Lim .................. H04W 52/0232 455/574 |
| 7,634,291 B2 | 12/2009 | Yamanaka et al. |

(Continued)

OTHER PUBLICATIONS

"A White Paper by the NGMN Alliance: NGMN Radio Access Performance Evaluation Methodology", retrieved on Mar. 19, 2012, <<http://www.ngmn.org/uploads/media/NGMN_Radio_Access_Performance_Evaluation_Methodology.pdf>>, NBMN Alliance, Jan. 31, 2008, 37 pages.

(Continued)

*Primary Examiner* — Harun Chowdhury
(74) *Attorney, Agent, or Firm* — Lee & Hayes, P.C.

(57) ABSTRACT

The techniques described herein detect which one of multiple different radio states a radio communication unit of a client device is currently operating in. The techniques may also learn one or more transition parameters that, once satisfied or reached, may switch the radio communication unit from one radio state to another radio state. Using the detected radio state and the learned transition parameters, the client device can optimize network communications.

20 Claims, 5 Drawing Sheets

(56) References Cited

U.S. PATENT DOCUMENTS

| | | | |
|---|---|---|---|
| 2003/0076785 A1 | 4/2003 | Purpura | |
| 2003/0076850 A1 | 4/2003 | Jason, Jr. | |
| 2003/0092375 A1* | 5/2003 | Iwanaga | H04W 48/18 455/3.01 |
| 2004/0223474 A1* | 11/2004 | Kwon | H04W 28/22 370/335 |
| 2005/0018613 A1 | 1/2005 | Yokota | |
| 2005/0111361 A1* | 5/2005 | Hosein | H04L 47/283 370/230 |
| 2006/0182022 A1 | 8/2006 | Abedi | |
| 2009/0141626 A1 | 6/2009 | Rogers | |
| 2010/0110950 A1 | 5/2010 | Kone et al. | |
| 2010/0120464 A1 | 5/2010 | Bjorken et al. | |
| 2010/0208613 A1 | 8/2010 | Oba et al. | |

OTHER PUBLICATIONS

Falaki et al., "A First Look at Traffic on Smartphones", IMC'10, Nov. 1-3, 2010, 7 pages.

Hauzner, "Data Traffic Model for Wireless Coexistence in US 3.65GHz band Simulation", retrieved on Mar. 19, 2012, <<www.ieee802.org>>, IEEE, Jan. 1, 2008, 6 pages.

Meyerovich et al., "Fast and Parallel Webpage Layout", In Proceedings of the 2010 World Wide Web Conference, Apr. 36-30, 2010, 10 pages.

Office action for U.S. Appl. No. 13/800,210, dated Nov. 30, 2016, Hui et al., "Mobile Network Traffic Optimization", 38 pages.

Office Action for U.S. Appl. No. 13/800,210, dated Mar. 25, 2015, Jie Hui, "Mobile Network Traffic Optimization", 16 pages.

Office action for U.S. Appl. No. 13/800,210, dated Jun. 1, 2016, Hui et al., "Mobile Network Traffic Optimization", 29 pages.

Final Office Action for U.S. Appl. No. 13/800,210, dated Jul. 16, 2015, Jie Hui, "Mobile Network Traffic Optimization", 22 pages.

The PCT Search Report and Written Opinion dated Jun. 28, 2013 for PCT application No. PCT/US13/31150, 11 pages.

Souders, "the Performance Golden Rule", retrieved on Mar. 19, 2012, <<http://www.stevesouders.com/blog/2012/02/10/the-performance-golden-rule>>, stevesouders.com, Feb. 10, 2012, 7 pages.

Zhao et al., "Energy-Aware Web Browsing in 3G Based Smartphones", retrieved on Mar. 19, 2012, <<http://www.cse.psu.edu/research/publications/tech-reports/2011>>, Technical Report, The Penn State Univ, 2011, 13 pages.

Zhao et al., "Reducing the Delay and Power Consumption of Web Browsing on Smartphones in 3G networks," IEEE International Conference on Distributed Computing Systems (ICDCS), Jun. 20-24, 2011, 10 pages.

\* cited by examiner

MOBILE NETWORK TRAFFIC OPTIMIZATION

CROSS REFERENCE TO RELATED APPLICATIONS

This is a continuation application which claims priority to commonly assigned, U.S. patent application Ser. No. 13/800,210, filed Mar. 13, 2013, which claims priority filing benefit from U.S. Provisional Patent Application No. 61/610,979, filed Mar. 14, 2012. Application Ser. No. 13/800,210 and 61/610,979 are fully incorporated herein by reference.

BACKGROUND

Modern telecommunication systems include heterogeneous mixtures of second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

The infrastructure that makes up the modern telecommunications networks comprises multiple different components or devices that are configured to transmit, receive, relay, and/or route data packets so that data services can be requested by, and provided to, user equipment (UE) subscribed to a plan offered by one or more service providers or network communication providers that implement the telecommunications networks.

The UE typically includes a radio communication unit that may operate in multiple radio states. Each radio state is associated with different communication or channel characteristics, such as a data packet size. Accordingly, based on an amount of data communication and/or interaction with a network, the radio communication unit of the UE may operate in different radio states and/or switch between radio states to save energy and avoid network traffic congestion.

Conventionally, the radio communication unit of the UE does not inform other components of the UE (e.g., applications, mobile browser, operating system (OS)) that configure and generate the data packets of the current radio state. Accordingly, the other components of the UE are unaware of the current radio state, and this may degrade a network's Quality of Service (QoS) and an end user's Quality of User Experience (QoE) at the UE because the radio communication unit may not be in a current radio state capable of optimizing network communication or traffic for the UE. Rather, the network and the UE may experience data communication bottlenecks, network congestion, data transfer overload, etc.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

The techniques described herein detect which one of multiple different radio states a radio communication unit of a user equipment (UE) is currently operating in. The techniques may also learn one or more state transition parameters that, once satisfied or reached, may switch the radio communication unit from one radio state to another radio state. For example, the transition parameters may be timing thresholds (e.g., an inactivity timer) for radio state transitions to lower power consumption radio states. In another example, the transition parameters may be queued (e.g., buffered) data amount for transfer thresholds for radio state transitions to higher power consumption radio states. The amount of data for transitioning to high power consumption radio states may be expressed in term of volume of data (Bytes). However, the transition parameters may also include a number of packets and/or a rate of data transmission (e.g., volume of data per unit of time).

Each radio state may be associated with different communication and channel characteristics (e.g., packet size, packet protocol, packet interval, etc.). Thus, different radio states consume varying levels of power. The amount of power consumed may be directly associated with data communication efficiency (e.g., higher power consumption means more efficient and faster data communications). Accordingly, after detecting the current radio state of the radio communication unit and/or learning the state transition parameters, components of the UE (e.g., applications, a mobile browser, an operating system (OS)) can manage data communications to optimize performance and improve a network's Quality of Service (QoS) and an end user's Quality of User Experience (QoE) at the UE. For example, components of the UE may manage data communication in accordance with the current radio state (e.g., particular communication or channel characteristics), or in anticipation, of a radio state switch based on the learned or predicted transition parameters.

As mentioned above, conventionally, the radio communication unit of the UE does not inform other components of the UE of the current radio state. That is, components of the UE "blindly" configure data for network communication without any sort of radio state awareness, and this may lead to communication bottlenecks and traffic congestion. The radio communication unit transitions between radio states based on a switch notification received from the network when the network determines it is time to switch radio states (e.g., after an inactivity timing threshold set by the network expires). Thus, the components of the UE are unaware of the current radio state and they are unable to anticipate or predict when a radio state transition may occur because they do not know the transition parameters configured by the network. In some scenarios, different networks may have different transition parameters. The UE may communicate, or establish a connection, with the different networks as it a result of its geographic mobility Accordingly, the techniques discussed herein allow the components of the UE that generate the network traffic to be aware of the current radio state and/or learn the transition parameters so that network traffic can be generated smartly. The smart generation of network traffic allows the UE to optimize performance and data communications, while also conserve energy.

Figure 1:
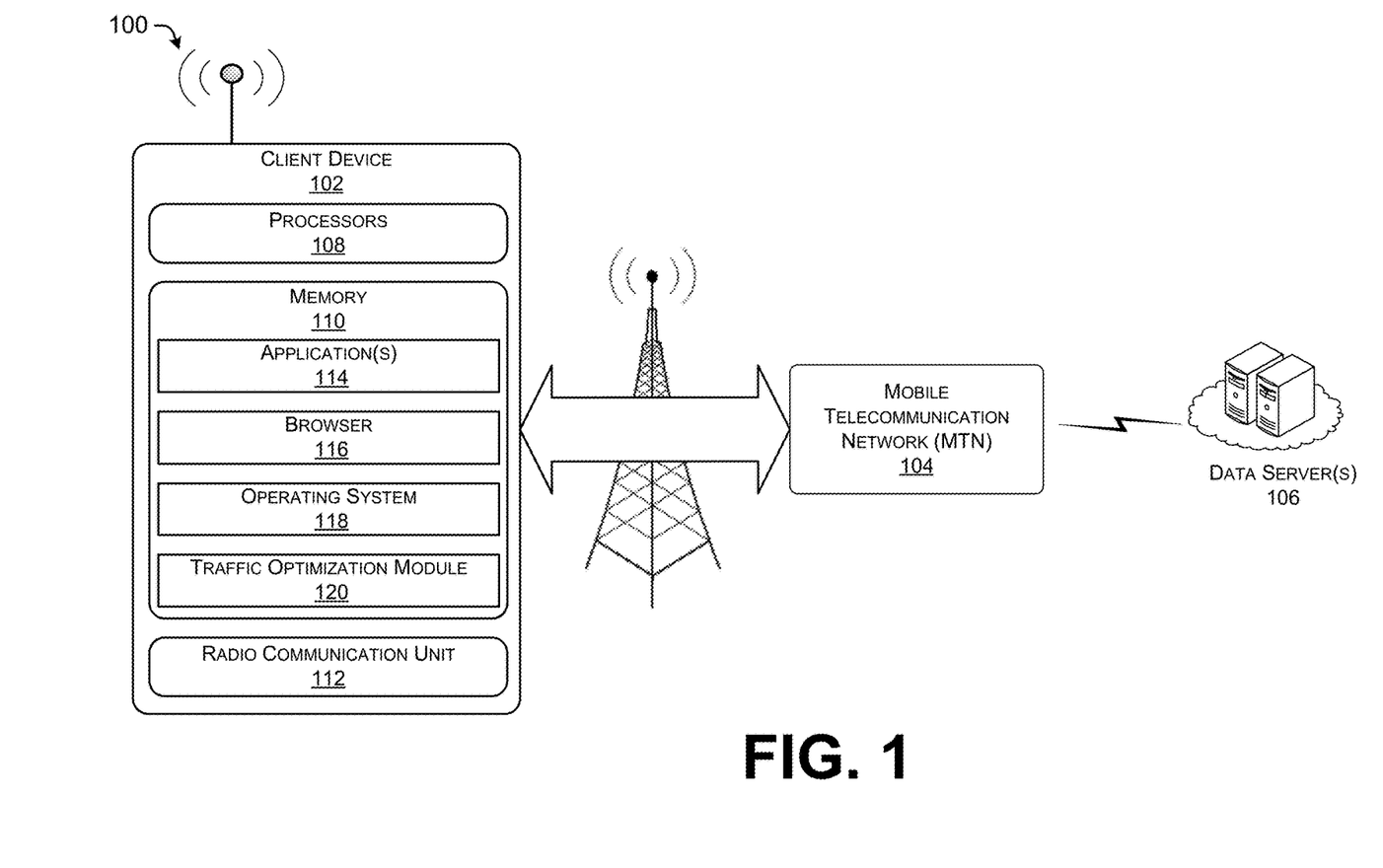
FIG. 1 depicts an example environment where a traffic optimization module determines the current radio state of a radio communication unit on a client device and learns transition parameters, in accordance with embodiments of the disclosure.

FIG. 1 depicts an illustrative environment 100 where a client device 102 (e.g., UE) communicates, via a mobile telecommunications network (MTN) 104, with one or more data servers 106 (e.g., Web servers). To this end, the client device 102 may include, but is not limited to, smart phones, mobile phones, cell phones, tablet computers, portable computers, laptop computer, personal digital assistants (PDAs), an electronic book device, a handheld gaming unit, a personal media player device, or any other portable or mobile electronic device that may generate voice and/or digital data, request voice and/or digital data over the MTN 104, receive voice and/or digital data over the MTN 104, and/or exchange voice and/or digital data over the MTN 104.

The MTN 104 may be configured to implement one or more of the second, third, and fourth generation (2G, 3G, and 4G) cellular-wireless access technologies discussed above. Thus, the MTN 104 may implement GSM, UMTS, and/or LTE/LTE Advanced telecommunications technologies. Different types of MTN nodes used in the GSM, UMTS, LTE, LTE Advanced, and/or HSPA+ telecommunications technologies may include, but are not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate and/or route data packets between the client device 102 and the data servers 106. While FIG. 1 illustrates an MTN 104, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

In various embodiments, some of the MTN nodes may be part of a core network (e.g., backhaul portion, carrier Ethernet) that is configured to access an IP-based network that provides data communications services such that the client device can access data servers 106 and download content from data servers 106. The data servers 106 may be owned and/or operated by web-based content/service providers, including, but not limited to: Bing®, Facebook®, Twitter®, Netflix®, Hulu®, YouTube®, Pandora®, iTunes®, Google Play®, Amazon Store®, CNN®, ESPN®, and the like. In various embodiments, the MTN 104 may be configured to exchange data packets between the client device 102 and the data servers 106 using wired and/or wireless links. Moreover, the MTN 104 may be configured to determine a communications path or "pipe" so that the data packets can be routed and exchanged accordingly.

FIG. 1 further illustrates example components of the client device 102. For example, the client device 102 may include one or more processor(s) 108, memory 110, and a radio communication unit 112 for wireless communication with the MTN 104. The memory 110 may store various applications 114, a mobile browser 116, a device operating system (OS) 118, and a traffic optimization module 120.

Each of the one or more processor(s) 108, can include one or more central processing units (CPUs) having multiple arithmetic logic units (ALUs) that perform arithmetic and logical operations, as well as one or more control units (CUs) that extract instructions and stored content from processor cache-level memory, and then executes instructions by calling on the ALUs during program execution. In an implementation, the processor(s) 108 may be configured to execute each of the applications 114 stored in the memory 110.

The memory 110 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

In various embodiments, the applications 114 stored at the client device 102 may include, but are not limited, a video streaming application, an online gaming application, a social networking application, a video conferencing application, an email application, a banking application, or any other application that is configured to generate and exchange data with data servers 106 over the MTN 104. During execution on the client device 102, each of the applications 114 may be configured to cause the client device 102 to initiate data communications with the data servers 106 over the MTN 104. The mobile browser 116 is configured to access and display Web content. The device OS 118 may be configured to manage hardware and services within and coupled to the client device 102 for the benefit of other modules or components. The client device 102 may be configured to run any compatible device OS 118, including but not limited to, Microsoft Windows Mobile®, Google Android®, Apple iOS®, Linux Mobile®, as well as any other common mobile device OS. Thus, each of the applications 114, the mobile browser 116, and the device OS 118 may request and/or receive data packets from the data servers 106, or other network nodes in the MTN 104.

In various embodiments, the communication functions between the client device 102 and the data servers 106 may be characterized in accordance with the Open Systems Interconnection (OSI) model that includes abstraction layers. The multiple layers may also correspond to the Internet Protocol (IP) suite. Thus, in various embodiments, the different layers may serve each other to generate and transmit a data packet (e.g., a request packet) to communicate to the data servers 106 over the MTN 104. Similarly, the different layers may work with each other to process a data packet (e.g., a response packet) received from the data servers 106 over the MTN 104.

In various embodiments, the traffic optimization module 120 may be configured to detect which one of multiple different radio states the radio communication unit 112 is currently operating in. Moreover, the traffic optimization module 120 may also learn one or more state transition parameters that, once satisfied or reached, may switch the radio communication unit 112 from one radio state to another radio state, as further discussed herein.

Accordingly, by making the applications 114, mobile browser 116, and/or device OS 118 aware of the current radio state and/or transition parameters, the traffic optimization module 120 is able to improve a network's QoS and an end user's QoE. The QoS and QoE may be measured in accordance with key performance indicators (KPIs) including, but not limited to, Web page loading time, Domain Name System (DNS) lookup time, Transmission Control Protocol (TCP) connect time, TCP round trip time (RTT), Hypertext Transfer Protocol (HTTP) response time, application start times, searching delay, video start delay, fast forward and rewind delay, a number of buffering events, duration per buffering event, rebuffering ratio, a video frame rate, average/minimum/maximum bit rate, traffic burstiness, amount of data bytes transferred, TCP retransmissions and TCP resets, physical retransmissions, physical RTT, etc. The KPIs provided above are presented as examples, and thus, the list is not exhaustive. Rather, service providers and/or network providers may contemplate a large number of different KPIs which aid in gauging the QoS and QoE associated with the data services provided.

Figure 2A:
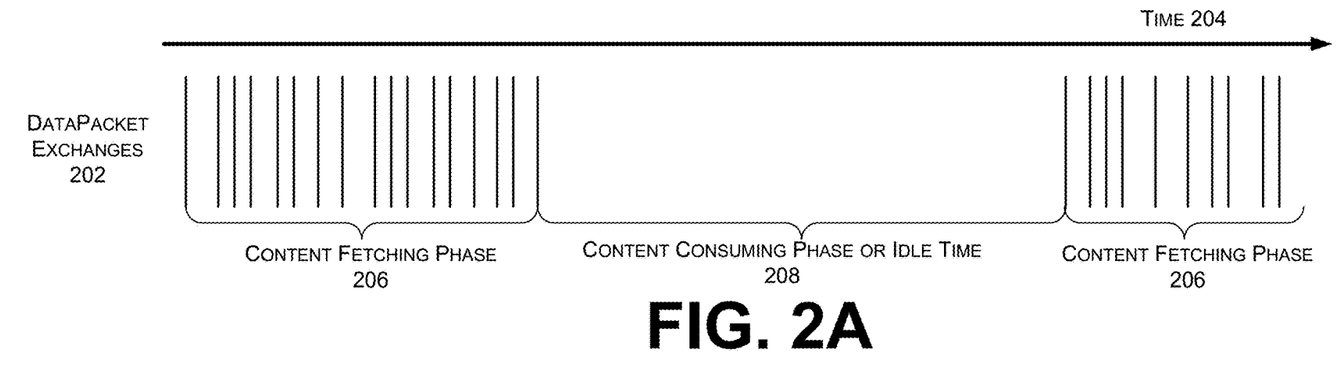
FIG. 2A depicts an example timing diagram for data packet exchanges, in accordance with embodiments of the disclosure.
Figure 2B:
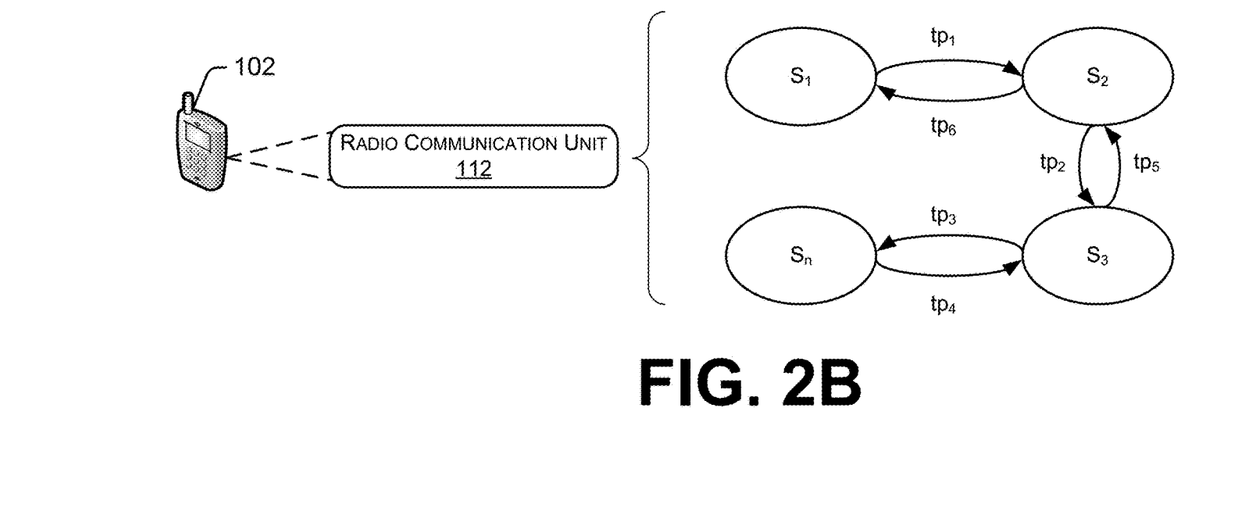
FIG. 2B depicts a radio communication unit of a client device switching between different radio states, in accordance with embodiments of the disclosure.

FIG. 2A illustrates an example timing diagram for data packet exchanges 202 (e.g., requests or responses) between the client device 102 and the data servers, while FIG. 2B shows the radio communication unit 112 of the client device 102 switching between different radio states in accordance with the example timing diagram, for example. The data packet exchanges 202 may be an example portion of a longer data communication session established by the client device and radio communication unit 112 for an application 114 or the mobile browser 116.

Accordingly, FIG. 2A depicts a time axis 204 associated with the data packet exchanges 202 between the client device 102 and the data servers 106 or an MTN node. Each tick or line represents a request packet that is communicated from the client device 102 to the data servers 106 or an MTN node, a response packet that is received at the client device 102 from the data servers 106 or an MTN node, or a request/response sequence. Thus, FIG. 2A shows two content fetching phases 206 when the radio communication unit 112 is requesting and downloading content from the data servers 106. In between the two content fetching phases is a content consuming phase or idle time 208 when the radio communication unit 112 is not exchanging data packets, or limiting its data communications, with the data servers 106 or an MTN node. In one example, a user may be reading or working on (e.g., consuming) the content fetched during the content consuming phase or idle time 208.

FIG. 2B shows different radio states ($S_1, \ldots, S_n$) for the radio communication unit 112. While four radio states are shown, it is understood that the radio communication unit 112 may operate in, and switch between, any number of radio states (e.g., n may be two, three, four, five and so forth). FIG. 2B further shows transition parameters (tp) to be satisfied or met when switching from one radio state to another radio state.

In at least one implementation, the different radio states ($S_1, \ldots, S_n$) for the radio communication unit 112 may correspond to the Radio Resource Control (RRC) protocol that belongs to UMTS. The radio states in the RRC protocol, in order of decreasing power consumption, are CELL_DCH (Dedicated Channel), CELL_FACH (Forward access channel), CELL_PCH (Cell Paging channel) or URA_PCH (URA Paging channel), and an RRC idle mode has the lowest energy consumption because there may be no connection. With respect to FIG. 2B, CELL_DCH may correspond to $S_1$, CELL_FACH may correspond to $S_2$, CELL_PCH or URA_PCH may correspond to $S_3$, and the idle mode may correspond to $S_n$. In an alternative implementation using LTE, there may be less than four radio states (e.g., two radio states such as a connected state or an idle state).

Accordingly, the radio communication unit 112 may operate in radio state $S_1$ when the client device 102 has a large amount of data to transfer and/or request (e.g., for applications 114 or mobile browser 116) and therefore needs a high power and high efficiency radio state. The radio communication unit 112 may operate in radio state $S_2$ when the client device 102 has a smaller amount of data to transfer, but does not need the high power and high efficiency radio state $S_1$. The radio communication unit 112 may operate in radio state $S_3$ when the client device 102 communicates with the MTN 104 so that the MTN 104 knows the client device is present. The radio communication unit 112 may operate in radio state $S_n$ when the client device 102 is in a deep sleep and the MTN 104 may not even recognize the client device 102.

For perspective, the power consumption of the radio communication unit 112 in the second radio state $S_2$ (e.g., CELL_FACH) may be approximately fifty percent of the power consumption in the first radio state $S_1$ (e.g., CELL_DCH). Moreover, the power consumption of the radio communication unit 112 in the third radio state $S_3$ (e.g., CELL_PCH or URA_PCH) may be approximately one to two percent of the power consumption in the first radio state $S_1$ (e.g., CELL_DCH).

Therefore, as illustrated in FIG. 2B, the radio communication unit 112 transitions between radio states to decrease energy consumption based on transition parameters (e.g., $tp_1$, $tp_2$, $tp_3$). In various embodiments, the transitions between radio states to decrease energy consumption may occur during the content consuming phase or idle time 208 when high power and high efficiency radio states are not required (e.g., the radio communication unit 112 may transition down from $S_1$ to $S_n$). Moreover, in various embodiments, the transition parameters $tp_1$, $tp_2$, $tp_3$ may be configured by an MTN 104 as an inactivity timer threshold. Thus, the MTN 104 may monitor network communications of the client device 102 and then instruct the radio communication unit 112 of the client device to switch states when the transition parameter is satisfied. In some embodiments, $tp_1$ may be an inactivity timer threshold that is set between zero and four seconds, $tp_2$ may be an inactivity timer threshold that is set between five and ten seconds, and $tp_3$ may an inactivity timer threshold that is set between one and thirty minutes.

In various embodiments, the radio communication unit 112 transitions between radio states to increase energy consumption based on transition parameters (e.g., $tp_4$, $tp_5$, $tp_6$). In various embodiments, the transitions between radio states to increase energy consumption may occur during the content fetching phases 206 when an increase in power and data communication efficiency may be warranted (e.g., the radio communication unit 112 may transition up from $S_n$ to $S_1$). In some embodiments, the transition parameters $tp_4$, $tp_5$, $tp_6$ may be configured by an MTN 104 as a queued data amount transfer threshold (e.g., a total amount of data that is buffered and waiting to be transmitted in one or multiple packets). Thus, the MTN 104 may monitor network communications of the client device 102 (e.g., receive indications or notifications from the client device 102) and then instruct the radio communication unit 112 of the client device 102 to switch states based on an amount of data waiting to be transferred (e.g., once the transition parameter is satisfied). In some embodiments, $tp_4$, $tp_5$ and/or $tp_6$ may be a queued data transfer threshold that is set to 512 bytes, 1024 bytes, and so forth.

As discussed above, each radio state is associated with different communication or channel characteristics (e.g., packet size, packet protocol, packet intervals, transmission rate, etc.) that may affect performance. One performance metric that may be monitored is latency. Moreover, different operators of various MTNs 104 or portions of MTNs 104 may have different configurations or settings for the transition parameters (e.g., different inactivity timers or different queued data amount transfer thresholds). Thus, the client device 102 can improve data communications and energy management by detecting a current radio state and learning the transition parameters configured and set by a particular MTN 104.

Figure 3:
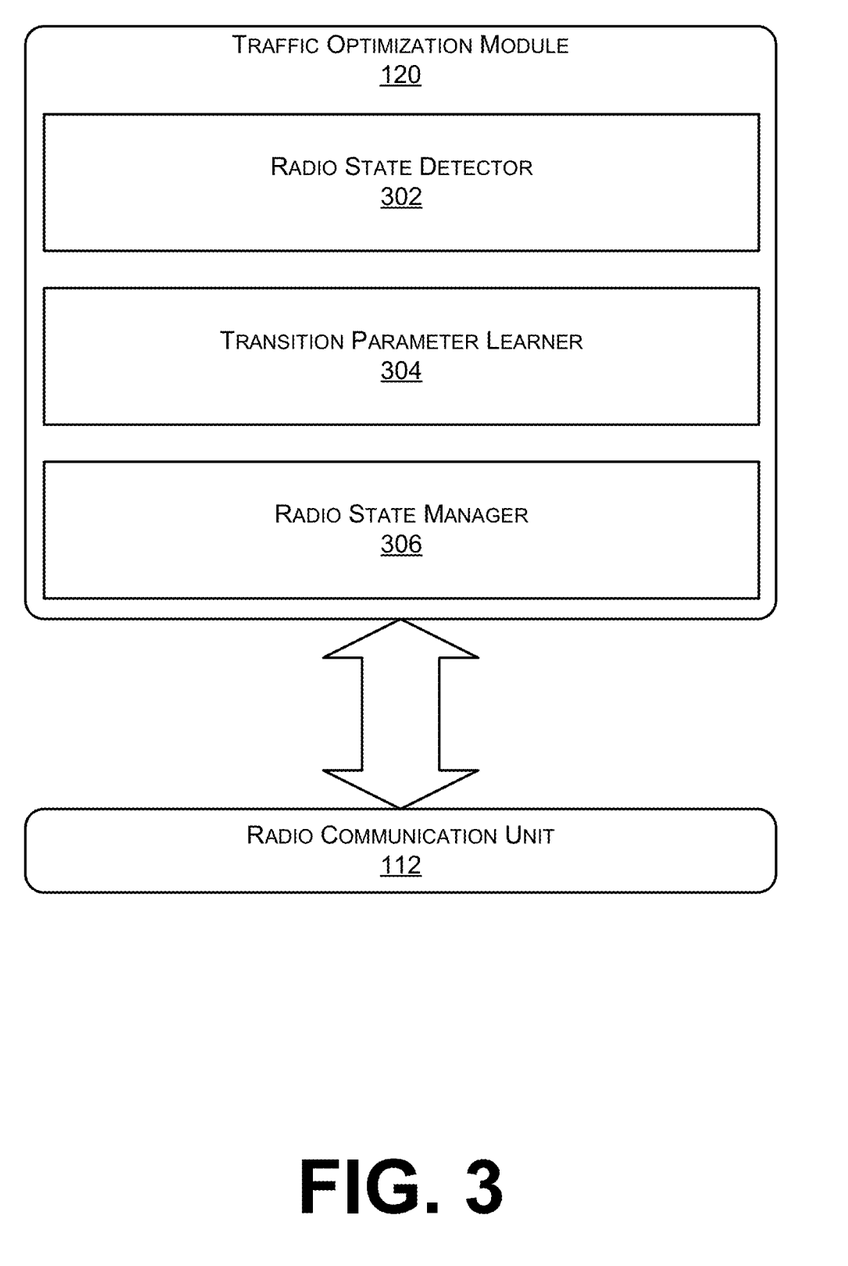
FIG. 3 depicts example components of the traffic optimization module, in accordance with embodiments of the disclosure.

FIG. 3 illustrates example components of the traffic optimization module 120. In various embodiments, the traffic optimization module 120 may include a radio state detector 302, a transition parameter learner 304, and/or a radio state manager 306. The traffic optimization module 120 is made available to other components (e.g., application 114, the mobile browser 116, or the device OS 118) of the client device 102 via a call function or other type of activation instruction. Therefore, the traffic optimization module 120 may be relied upon to determine radio state awareness (e.g., detect the current radio state and/or learn the transition parameters). Accordingly, as illustrated in FIG. 3, the components of the traffic optimization module 120 may interact with the radio communication unit 112 of the client device 102 to determine radio state awareness information.

In various embodiments, the radio state detector 302 is configured to detect the current radio state the radio communication unit 112 is operating in (e.g., the different radio states discussed above with respect to FIG. 2B). For example, upon request or activation of the traffic optimization module 120, the radio state detector 302 may generate one or more "test" packets to be communicated by the radio communication unit 112 over time. In some embodiments, a test packet may not be part of a real communication session for an application 114, the mobile browser 116, and/or the device OS 118, and thus, the test packet may not be a "real" packet communicated on behalf of the other components. In other embodiments, a test packet may be part of a real communication session, and therefore, may be a real packet communicated on behalf of the other components. The radio state detector 302 may configure a test packet in accordance with different communication and channel characteristics (e.g., packet size, packet protocol, packet intervals, etc.). Therefore, the radio state detector 302 may then determine which radio state the radio communication unit 112 is currently in by monitoring performance metrics of the one or more test packets and the network responses to the test packets (e.g., RTT, latency, etc.).

In various embodiments, the transition parameter learner 304 learns, or predicts, the transition parameters discussed above with respect to FIG. 2B. Therefore, the transition parameter learner 304 may include logic to track and monitor communication and channel characteristics of multiple different test packets, as well as the performance metrics for the packets, to determine when the radio communication unit 112 switches radio states. The transition parameter learner 304 may consider timing factors for the monitored packets, as well as packet size factors.

For example, the transition parameter learner 304 may determine that the radio state does not switch between two sequential packets separated by a certain amount of time. Thus, the transition parameter learner 304 may learn that a network's inactivity timer (e.g., $tp_1$, $tp_2$, $tp_3$) is at least the certain amount of time since the radio state did not change. In contrast, if the radio state switches, the transition parameter learner 304 may learn that the network's inactivity timer (e.g., $tp_1$, $tp_2$, $tp_3$) is less than the certain amount of time. The transition parameter learner 304 may repeat this process and vary the amount of time that separates the two sequential packets to make the learning, or prediction, more accurate.

In another example, the transition parameter learner 304 may track different test packets that vary in size so that an amount of data to be transferred can be tracked and the thresholds for transition parameters $tp_4$, $tp_5$, $tp_6$ can be determined. Based on the tracked packet size, the transition parameter learner 304 is able to learn the queued data amount for transfer thresholds.

In various embodiments, the transition parameter learner 304 may learn the transition parameters in accordance with a pre-defined schedule (e.g., periodic), to account for time drafting and/or to learn transition parameters configured differently for varying MTNs.

In various embodiments, the radio state manager 306 may manage the radio communication unit 112. For example, after the traffic optimization module 120 communicates the current radio state and/or the learned transition parameters to the application 114, the mobile browser 116, or the device OS 118, the radio state manager 306 may receive an instruction to switch the current radio state of the radio communication unit 112. That is, the radio state manager 306 can configure additional test packets, of a particular size, that are known to satisfy the transition parameters, and move the radio communication unit 112 from one state to another (e.g., a lower power and lower efficiency state to a higher power and higher efficiency state).

Accordingly, the radio state detector 302, transition parameter learner 304, and the radio state manager 306 may be a function of other client device 102 components, and therefore, they may be called upon to determine radio state awareness information of the client device 102 and an MTN 104 (e.g., a current radio state of the radio communication unit 112 and the transition parameters set by the MTN 104).

Figure 4:
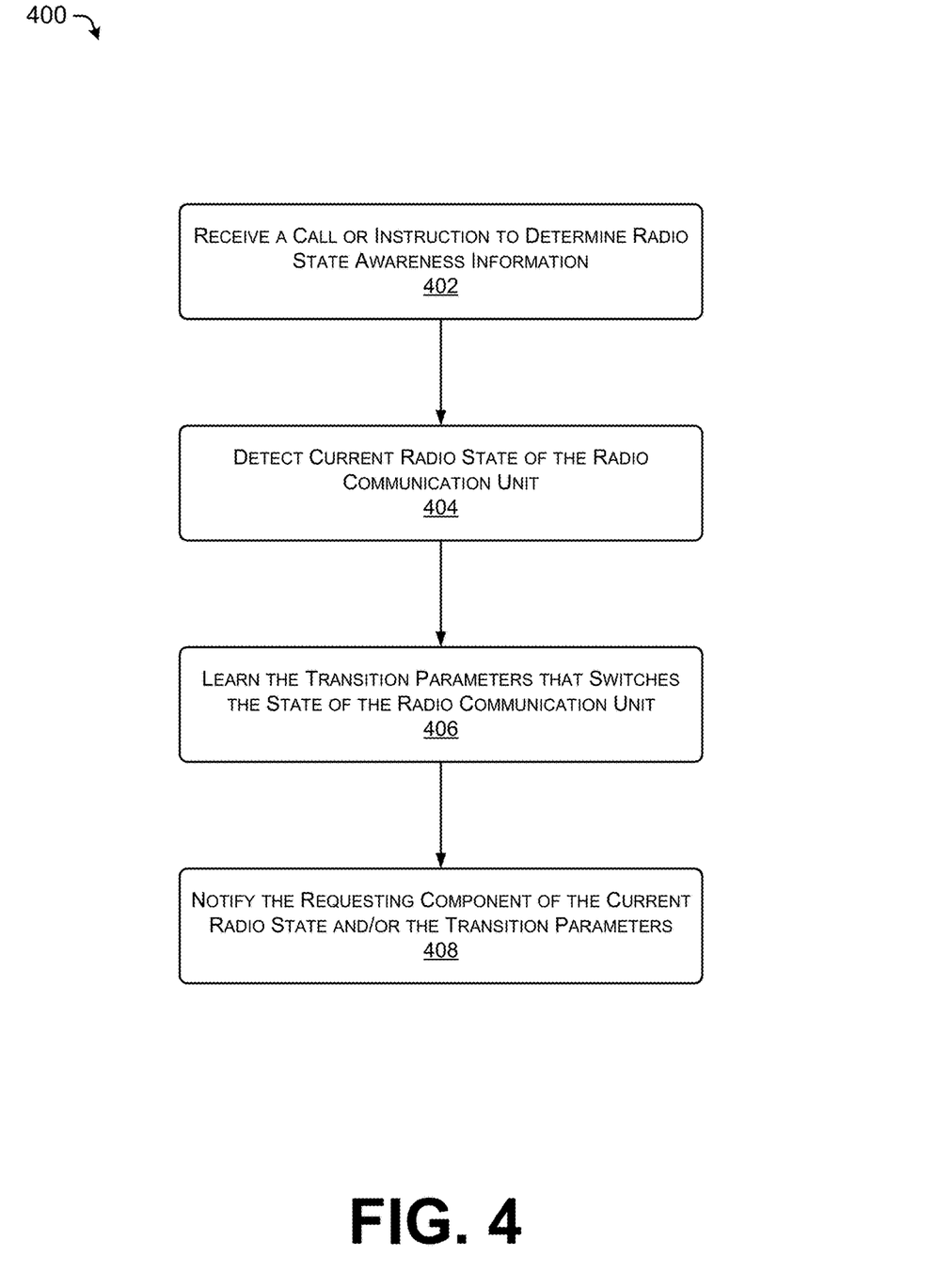
FIG. 4 is a flow chart of an example process for detecting a current radio state and learning transition parameters, in accordance with embodiments of the disclosure.
Figure 5:
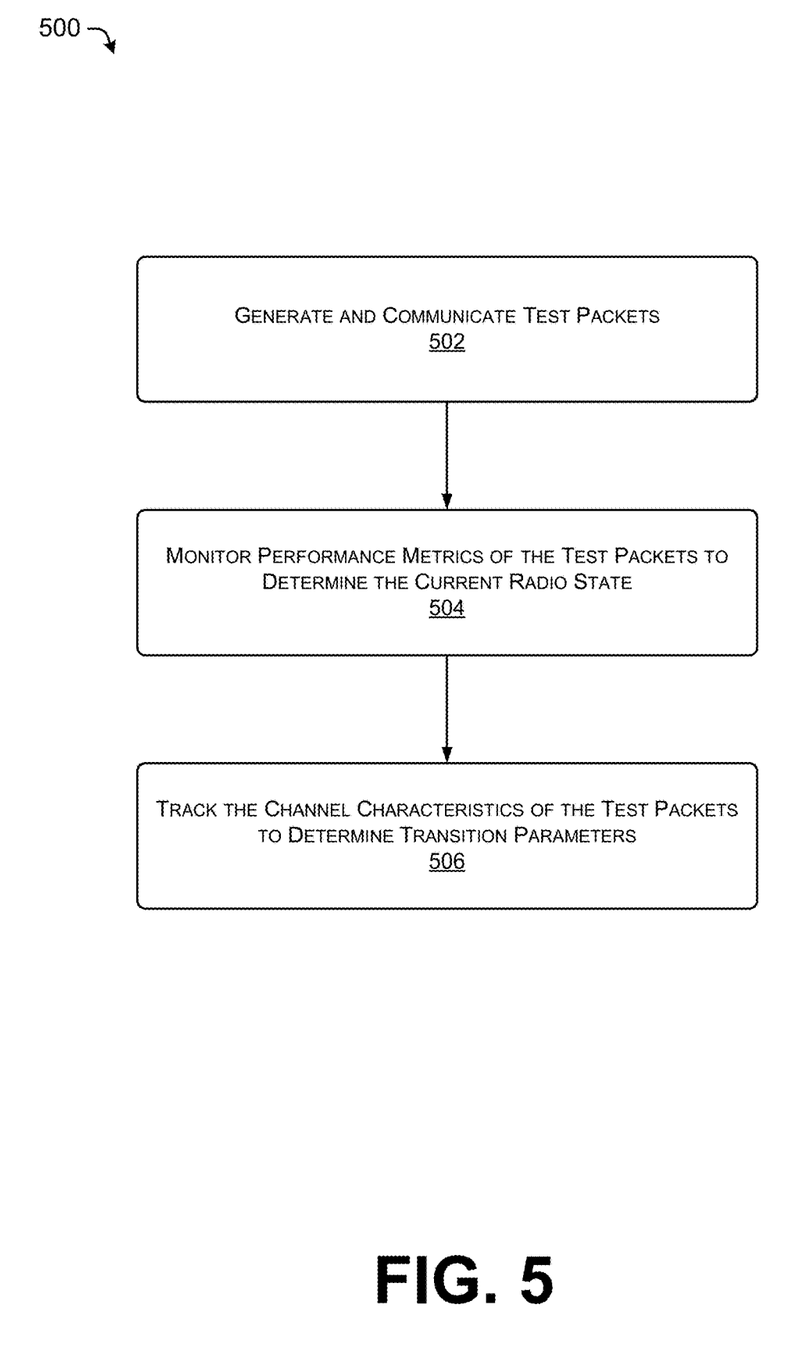
FIG. 5 is a flow chart of another example process for detecting a current radio state and learning transition parameters, in accordance with embodiments of the disclosure.

FIGS. 4 and 5 present illustrative processes for detecting a current radio state, learning radio state transition parameters, and using the detected and learned information to manage network communications (e.g., network traffic). Each process is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes in FIGS. 4 and 5 are described with reference to FIGS. 1-3.

FIG. 4 shows a flow diagram of an example process 400 for detecting a current radio state and learning transition parameters. The example process 400 may that may be performed by the components of the computing device 102.

At block 402, the traffic optimization module 120 receives a call or instruction to determine radio state awareness information. In some embodiments, the call or instruction is issued by one or more applications 114, a browser 116, a device OS 118, or a combination thereof. Moreover, the call or instruction may be issued prior to establishing a data communication session (e.g., a video streaming session) or during a data communication session. To this end, the call or instruction may be issued so that the applications 114, the mobile browser 116, or the device OS 118 can manage data communications based on the radio state awareness, which may improve QoS and QoE.

At block 404, the radio state detector 302 of the traffic optimization module 120 detects the current radio state that the radio communication unit 112 is operating in. As previously discussed, typically the radio communication unit 112 does not communicate a current radio state to applications or a device OS, and therefore, "smart" data traffic cannot be configured.

At block 406, the transition parameter learner 304 of the traffic optimization module 120 learns the transition parameters that switch the radio communication unit 112 from one state to another. As discussed above, the transition parameters may be inactivity timer thresholds set by an MTN 104 so that the radio states transition to lower power consumption and lower transfer efficiency states when network activity begins to decrease (e.g., after a user ends a video streaming session and therefore is no longer requesting/receiving large amount of data from data servers 106). Or, the transition parameters may be queued data transfer amount thresholds set by the network so that the radio states transition to higher power consumption and higher transfer efficiency states when network activity starts increasing (e.g., when a user begins streaming video and therefore will be requesting/receiving large amount of data from data servers 106).

At block 408, the traffic optimization module 120 may notify the requesting application 114, the mobile browser 116, and/or the device OS 118 of radio state awareness information detected and learned (e.g., the current radio state and the transition parameters). For example, the traffic optimization module 120 may expose the requesting component to the information via an application programming interface. Accordingly, the application 114, the mobile browser 116, and/or the device OS 118 can use the radio state awareness information to manage data communications, and optimize QoS and QoE. For example, the application 114, the mobile browser 116, and/or the device OS 118 may generate data packets in accordance with communication and channel characteristics (e.g., packet size, packet protocol, packet intervals, etc.) of the current radio state. In another example, the application 114, the mobile browser 116, and/or the device OS 118 may generate data packets knowing that the data packets will satisfy particular transition parameters, and therefore, trigger a radio state switch to a radio state whose channel characteristics can better handle the data communications. In yet another example, the application 114, the mobile browser 116, and/or the device OS 118 may request that the radio state manager 306 trigger the state change to a radio state whose channel characteristics can better handle the data communications.

In various embodiments, the traffic optimization module 120 may store information relating to the current radio state and/or the transition parameters so that one or both of blocks 404 or 406 may not have to be implemented for subsequent calls if the stored information is likely accurate (e.g., a predetermined amount of time has not elapsed and the client device 102 is still communicating with the same MTN 104). For example, advanced heuristics may be used to minimize the use of test packets and communication monitoring. Accordingly, the traffic optimization module 120 may learn and store information for specific radio characteristics detected from the network (e.g., network identity, cell identity, etc.) for future consideration. Thus, the radio state awareness information may be known when the client device 102 returns to the same coverage area and the information may not have to be determined again. The radio state awareness information may be stored locally at the client device 102 or as assistance data on an external device. In this embodiment, the traffic optimization module 120 may convey the radio state awareness information to a requesting component in response to receiving a request for the information, or a request to determine the information.

In other embodiments, the initial call to determine radio state awareness may also include a preferred radio state for the application 114, the mobile browser 116, or the device OS 118 making the call. In these embodiments, the radio state manager 306 may automatically trigger a radio state change, if necessary, after the current radio state is determined and/or the transition parameters learned.

FIG. 5 shows a flow diagram of another example process 500 for detecting a current radio state and learning transition parameters. The example process 500 shows operations that expand on blocks 404 and 406 in FIG. 4, and that may be performed by the components that are part of the traffic optimization module 120.

At block 502, the radio state detector 302 generates one or more test packets to be communicated by the radio communication unit 112 to data servers 106 or an MTN node. As discussed above, the radio state detector 302 may generate the test packets based on channel characteristics associated with a particular radio state.

At block 504, the radio state detector 302 monitors the performance metrics of the one or more test packets to determine the current radio state. In various embodiments, the performance metric is RTT and/or latency of the test packet and a corresponding response. Moreover the performance metrics may be one or more of throughput, packet loss rate, or packet retransmission rate. If the performance metrics are in line with what was expected for the test packet, than the radio communication unit 112 is in the particular radio state that corresponds to the channel characteristics used to generate the test packet. If the performance metrics of the test packet are not what was expected, the radio state detector 302 may determine the current radio state based on the performance (e.g., sub-par performance, or better than expected performance).

At block 506, the transition parameter learner 304 tracks the channel characteristics of the test packets, as well as the performance metrics for the packets, to determine when the radio communication unit 112 switches radio states. Using the tracked information, the transition parameter learner 304 learns, or predicts, the transition parameters set by the network. In various embodiments, the transition parameter learner 304 may consider timing factors for the tracked packets, as well as packet size factors.

Accordingly, the traffic optimization module 120 may "smartly" and intentionally vary the characteristics of the test packets in a controlled testing environment so that the current radio state and/or the transition parameters can be learned based on monitoring the performance metrics of the test packets. In various embodiments, the current radio state and/or the transition parameters may be learned based on monitoring the performance metrics of the real packets.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, from a component on a client device, an instruction to determine radio state information;
generating a plurality of test packets to be transmitted by a radio communication unit of the client device through a network, the plurality of test packets including a first test packet having a first size and a second test packet having a second size that is different than the first size;
transmitting, by the radio communication unit of the client device, the plurality of test packets through the network;
receiving, by the radio communication unit of the client device, one or more responses to the plurality of test packets;
monitoring performance metrics of the plurality of test packets and the one or more responses to the plurality of test packets;
learning, based at least in part on the performance metrics, state transition parameters for a particular cell that switch the radio communication unit between radio states, wherein the state transition parameters include:
a first state transition parameter based on the first test packet having the first size and a second state transition parameter based on the second test packet having the second size;
a queued data amount transfer threshold that, when satisfied, switches the radio communication unit from a first power consumption state to a second power consumption state, wherein the second power consumption state consumes more power than the first power consumption state and the queued data amount transfer threshold comprises a plurality of queued data amount transfer thresholds individually used to increase power consumption of the radio communication unit as network communication activity increases; and
an inactivity timing threshold that, when satisfied, switches the radio communication unit from a third power consumption state to a fourth power consumption state, wherein the fourth power consumption state consumes less power than the third power consumption state and the inactivity timing threshold comprises a plurality of inactivity timing thresholds individually used to decrease power consumption of the radio communication unit as the network communication activity decreases;
using the state transition parameters to manage data communications via the particular cell; and
storing the state transition parameters on the client device.

2. The method of claim 1, further comprising:
notifying the component or another component on the client device of a current radio state and the state transition parameters; and
configuring data communications to trigger a switch from the current radio state to another radio state.

3. The method of claim 1, wherein the switching from the first power consumption state to the second power consumption state or the switching from the third power consumption state to the fourth power consumption state improves data communication efficiency.

4. The method of claim 1, wherein the performance metrics comprise latency.

5. The method of claim 1, wherein the plurality of test packets are generated based in part on a plurality of different channel characteristics corresponding to a plurality of different radio states.

6. The method of claim 1, further comprising, in association with a request to perform second data communications via the particular cell:
determining that a predetermined amount of time has not elapsed since the state transition parameters were used to manage the data communications via the particular cell;
accessing, based at least in part on the determining that the predetermined amount of time has not elapsed, the stored state transition parameters; and
using the stored state transition parameters to manage the second data communications via the particular cell.

7. The method of claim 1, wherein the stored state transition parameters are accessed in response to the client device returning to a coverage area of the particular cell, the stored state transition parameters of the particular cell of the network being different than other state transition parameters of another cell of the network.

8. The method of claim 1, wherein generating the plurality of test packets is performed in a testing environment and the plurality of test packets are unassociated with a data communication session for an application of the client device.

9. One or more computer storage devices storing computer-executable instructions that, when executed by one or more processors, perform operations comprising:
generating, by a client device, a plurality of packets to be communicated by a radio communication unit of the client device, the plurality of packets including a first packet having a first size and a second packet having a second size that is different than the first size;
communicating the plurality of packets through a particular cell of a network;
monitoring performance metrics of at least a portion of the plurality of packets;
determining, based at least in part on the performance metrics, a current radio state of the radio communication unit;
learning, based at least in part on the performance metrics, state transition parameters that switch the radio communication unit from the current radio state, wherein the state transition parameters include:
a first state transition parameter based on the first packet having the first size and a second state transition parameter based on the second packet having the second size;

a queued data amount transfer threshold that, when satisfied, switches the radio communication unit from the current radio state to a first switched radio state that consumes more power than the current radio state, wherein the queued data amount transfer threshold comprises a plurality of queued data amount transfer thresholds individually used to increase power consumption of the radio communication unit as network communication activity increases; and an inactivity timing threshold that, when satisfied, switches the radio communication unit from the current radio state to a second switched radio state that consumes less power than the current radio state, wherein the inactivity timing threshold comprises a plurality of inactivity timing thresholds individually used to decrease power consumption of the radio communication unit as the network communication activity decreases;

using the state transition parameters to manage data communications via the particular cell; and storing the state transition parameters on the client device.

10. The one or more computer storage devices of claim 9, wherein the operations further comprise:
notifying a component on the client device of the current radio state and the state transition parameters; and
configuring data communications to trigger a switch from the current radio state to at least one of the first switched radio state or the second switched ratio state.

11. The one or more computer storage devices of claim 9, wherein at least some of the plurality of packets are test packets generated based in part on a plurality of different channel characteristics corresponding to a plurality of different radio states.

12. The one or more computer storage devices of claim 9, wherein at least some of the plurality of packets are real packets generated for a data communication session initiated by a component operating on the client device.

13. The one or more computer storage devices of claim 9, wherein the operations further comprise, in association with a request to perform second data communications via the particular cell:
determining that a predetermined amount of time has not elapsed since the state transition parameters were used to manage the data communications via the particular cell;
accessing, based at least in part on the determining that the predetermined amount of time has not elapsed, the stored state transition parameters; and
using the stored state transition parameters to manage the second data communications via the particular cell.

14. The one or more computer storage devices of claim 9, wherein the stored state transition parameters are accessed in response to the client device returning to a coverage area of the particular cell, the stored state transition parameters of the particular cell of the network being different than other state transition parameters of another cell of the network.

15. The one or more computer storage devices of claim 9, wherein the operations further comprise managing data communications based in part on the current radio state and the state transition parameters to optimize a user experience.

16. The one or more computer storage devices of claim 9, wherein the performance metrics comprise latency.

17. The one or more computer storage devices of claim 9, wherein state transition parameters are set by the network.

18. A device comprising:
one or more processors;
one or more memories;
a radio state detector, stored on the one or more memories and operable by the one or more processors, that:
generates a plurality of test packets to be communicated by the radio state detector, the plurality of test packets including a first test packet having a first size and a second test packet having a second size that is different than the first size;
monitors performance metrics of at least a portion of the plurality of test packets;
a transition parameter learner module, stored on the one or more memories and operable by the one or more processors, that learns state transition parameters for a particular cell, based on the performance metrics, that switches a radio communication unit from a current radio state, wherein the state transition parameters include:
a first state transition parameter based on the first test packet having the first size and a second state transition parameter based on the second test packet having the second size;
a queued data amount transfer threshold that, when satisfied, causes the radio communication unit to switch from the current radio state to a first switched radio state that consumes more power than the current radio state thereby increasing a level at which queued data is communicated, wherein the queued data amount transfer threshold comprises a plurality of queued data amount transfer thresholds individually used to increase power consumption of the radio communication unit as network communication activity increases; and
an inactivity timing threshold that, when satisfied, causes the radio communication unit to switch from the current radio state to a second switched radio state that consumes less power than the current radio state, wherein the inactivity timing threshold comprises a plurality of inactivity timing thresholds individually used to decrease power consumption of the radio communication unit as the network communication activity decreases; and
a radio state manager module, stored on the one or more memories and operable by the one or more processors, that:
triggers a radio state switch from the current radio state to the first switched radio state or the second switched radio state based at least on the state transition parameters;
uses the state transition parameters to manage data communications via the particular cell; and
stores the state transition parameters on the device.

19. The device in claim 18, wherein the radio state manager module further performs operations comprising, in association with a request to perform second data communications via the particular cell:
determining that a predetermined amount of time has not elapsed since the state transition parameters were used to manage the data communications via the particular cell;
accessing, based at least in part on the determining that the predetermined amount of time has not elapsed, the stored state transition parameters; and
using the stored state transition parameters to manage the second data communications via the particular cell.

20. The device of claim 18, wherein the state transition parameters are accessed in response to the device being located in a coverage area of the particular cell, the state transition parameters of the particular cell of the network being different than other state transition parameters of another cell of the network.

* * * * *